(12) United States Patent
Makimura et al.

(10) Patent No.: US 9,845,090 B2
(45) Date of Patent: Dec. 19, 2017

(54) HYBRID VEHICLE

(71) Applicant: MITSUBISHI JIDOSHA KOGYO KABUSHIKI KAISHA, Tokyo (JP)

(72) Inventors: Ken Makimura, Obu (JP); Noriyuki Mihara, Okazaki (JP); Hisashi Sakai, Toyohashi (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 267 days.

(21) Appl. No.: 14/816,856

(22) Filed: Aug. 3, 2015

(65) Prior Publication Data

US 2015/0336572 A1 Nov. 26, 2015

Related U.S. Application Data

(63) Continuation of application No. PCT/JP2014/053044, filed on Feb. 10, 2014.

(30) Foreign Application Priority Data

Feb. 12, 2013 (JP) .................................. 2013-024453

(51) Int. Cl.
*B60L 9/00* (2006.01)
*B60W 20/40* (2016.01)
(Continued)

(52) U.S. Cl.
CPC ............. *B60W 20/40* (2013.01); *B60K 6/442* (2013.01); *B60L 11/14* (2013.01); *B60W 10/02* (2013.01); *B60W 10/06* (2013.01); *B60W 10/08* (2013.01); *B60W 10/26* (2013.01); *B60W 20/10* (2013.01); *B60W 20/14* (2016.01); *B60W 20/17* (2016.01); *F02D 29/02* (2013.01); *F02D 37/02* (2013.01); *F02P 5/1502* (2013.01); *B60W 2510/244* (2013.01); *B60W 2520/04* (2013.01); *B60W 2710/021* (2013.01); *B60W 2710/0666* (2013.01); *B60W 2710/08* (2013.01); *B60Y 2300/436* (2013.01); *F02D 2200/501* (2013.01);
(Continued)

(58) Field of Classification Search
CPC ......... B60L 2240/423; B60L 2240/445; B60L 2240/421
See application file for complete search history.

(56) References Cited

U.S. PATENT DOCUMENTS

| | | |
|---|---|---|
| 5,550,445 A | 8/1996 | Nii |
| 2004/0121882 A1* | 6/2004 | Tajima ................... B60K 6/485 477/3 |

(Continued)

FOREIGN PATENT DOCUMENTS

| | | |
|---|---|---|
| JP | 7-95703 A | 4/1995 |
| JP | 2008-105555 A | 5/2008 |

(Continued)

*Primary Examiner* — Redhwan K Mawari
(74) *Attorney, Agent, or Firm* — Birch, Stewart, Kolasch & Birch, LLP

(57) ABSTRACT

If a vehicle speed is less than a predetermined value when a hybrid control mode is a series mode and a charge mode is selected (S10-S14), it is determined whether an SOC of a high voltage battery is less than a predetermined value or not (S16), and when the SOC of the high voltage battery is less than the predetermined value, ignition timing is corrected to be retarded (S18).

12 Claims, 2 Drawing Sheets

(51) Int. Cl.

| | | |
|---|---|---|
| *B60W 10/08* | (2006.01) | |
| *B60W 10/26* | (2006.01) | |
| *B60W 10/02* | (2006.01) | |
| *B60W 20/10* | (2016.01) | |
| *B60K 6/442* | (2007.10) | |
| *B60L 11/14* | (2006.01) | |
| *B60W 10/06* | (2006.01) | |
| *F02P 5/15* | (2006.01) | |
| *F02D 37/02* | (2006.01) | |
| *F02D 29/02* | (2006.01) | |
| *B60W 20/14* | (2016.01) | |
| *B60W 20/17* | (2016.01) | |

(52) U.S. Cl.
CPC ......... *F02D 2200/503* (2013.01); *Y02T 10/46* (2013.01); *Y02T 10/6234* (2013.01); *Y02T 10/70* (2013.01); *Y02T 10/7077* (2013.01); *Y10S 903/93* (2013.01)

(56) References Cited

U.S. PATENT DOCUMENTS

| | | | |
|---|---|---|---|
| 2008/0103682 A1* | 5/2008 | Sugimoto | B60K 6/445 701/111 |
| 2010/0062899 A1* | 3/2010 | Engelmann | F16D 25/0638 477/86 |
| 2010/0108032 A1* | 5/2010 | Pursifull | B60W 10/06 123/406.12 |
| 2012/0191280 A1 | 7/2012 | Ohno | |
| 2012/0296541 A1* | 11/2012 | Matsushita | B60W 10/06 701/70 |
| 2013/0296115 A1* | 11/2013 | Grutter | B60K 6/48 477/5 |

FOREIGN PATENT DOCUMENTS

| | | | |
|---|---|---|---|
| JP | 2009234359 A | * | 10/2009 |
| JP | 2010-195306 A | | 9/2010 |
| JP | 2011-011647 A | | 1/2011 |
| JP | 2012-148732 A | | 8/2012 |

* cited by examiner

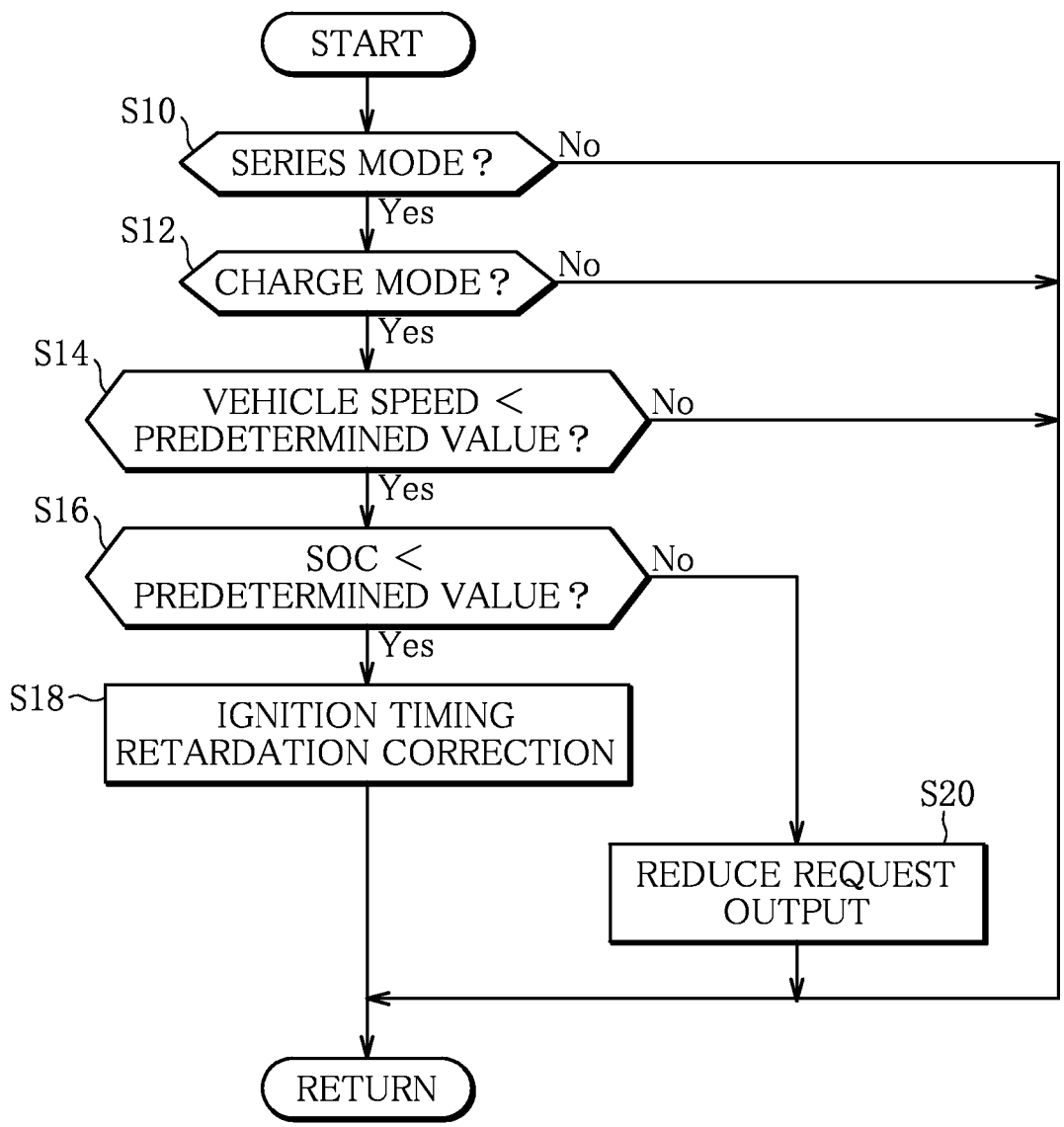

HYBRID VEHICLE

CROSS REFERENCE TO RELATED APPLICATIONS

This application is a Continuation of PCT International Application No. PCT/JP2014/053044 filed on Feb. 10, 2014, which claims priority under 35 U.S.C. 119(a) to Patent Application No. 2013-024453, filed in Japan on Feb. 12, 2013, all of which are hereby expressly incorporated by reference into the present application.

TECHNICAL FIELD

The present invention relates to a hybrid vehicle, and more particularly to a technology for controlling ignition timing of an internal combustion engine during a stop of the vehicle.

BACKGROUND ART

In recent years, a hybrid vehicle including both an internal combustion engine and an electric motor used as power sources has been developed for increasing fuel efficiency and reducing an amount of exhaust gas.

As in Patent Document 1, such a hybrid vehicle includes a clutch between drive wheels and an internal combustion engine, and the clutch is connected/disconnected to switch between a series mode and a parallel mode.

In the series mode in Patent Document 1, the clutch is disconnected to drive a power generator with power of the internal combustion engine, the electric motor coupled to a drive axle is driven by electric power obtained by the power generator to cause the vehicle to travel. In the parallel mode, the clutch is connected to drive the drive axle with power of the internal combustion engine and drive the electric motor coupled to the drive axle with electric power obtained by a storage battery to cause the vehicle to travel with both the power of the internal combustion engine and the power of the electric motor according to a driving state of the vehicle.

PRIOR ART DOCUMENT

Patent Document

Patent Document 1: Japanese Patent Laid-Open No. 2011-11647

SUMMARY OF THE INVENTION

Problems to be Solved by the Invention

In the hybrid vehicle in Patent Document 1, output torque of the internal combustion engine in the series mode is determined based on electric power supplied to the electric motor by the power generator.

However, some hybrid vehicles have a power generation mode in which even during a stop of the vehicle, a clutch is disconnected to operate an internal combustion engine, a power generator is driven by power of the internal combustion engine, and electric power obtained by the power generator is supplied to a storage battery or an electrical apparatus outside the vehicle.

In such a hybrid vehicle, if output torque of the internal combustion engine is determined based on electric power supplied to the storage battery by the power generator, the internal combustion engine is operated at low rotational speed under high load depending on electric power supplied to the storage battery or the electrical apparatus outside the vehicle by the power generator.

If the internal combustion engine is operated at low rotational speed under high load, knocking may occur.

If such knocking occurs during the stop of the vehicle, a driver hears knocking sound because there is no noise such as traveling sound during the stop of the vehicle, which may unpreferably provide discomfort to a driver.

The present invention is achieved to solve these problems, and has an object to provide a hybrid vehicle capable of preventing occurrence of knocking in driving at low rotational speed under high load of an internal combustion engine during a stop of a vehicle.

Means for Solving the Problems

To achieve the object, a hybrid vehicle according to the present invention is a hybrid vehicle with an internal combustion engine, comprising: a power generator that is driven by the internal combustion engine; a vehicle control device that detects a traveling state of the vehicle including predetermined stop state; a driving mode in which the hybrid vehicle is driven by electric power generated by the power generator; and an ignition timing correction portion that corrects ignition timing of the internal combustion engine to a retardation side when it is detected that the traveling state of the vehicle is the predetermined stop state in the driving mode.

Advantageous Effects of the Invention

According to the invention, when the traveling state of the vehicle is the predetermined stop state, the ignition timing of the internal combustion engine is corrected to the retardation side.

Thus, in the predetermined stop state such as during a stop of the vehicle, the ignition timing of the internal combustion engine is corrected to the retardation side, thereby preventing occurrence of knocking during operation of the internal combustion engine in the predetermined stop state such as during the stop of the vehicle.

Preventing knocking sound from being produced by occurrence of knocking can prevent discomfort to a driver.

BRIEF DESCRIPTION OF THE DRAWINGS

FIG. 2 is a flowchart of a control routine for stop-time knocking preventing control performed by a hybrid control unit and an engine control unit.

Mode for Carrying out the Invention

Figure 1:
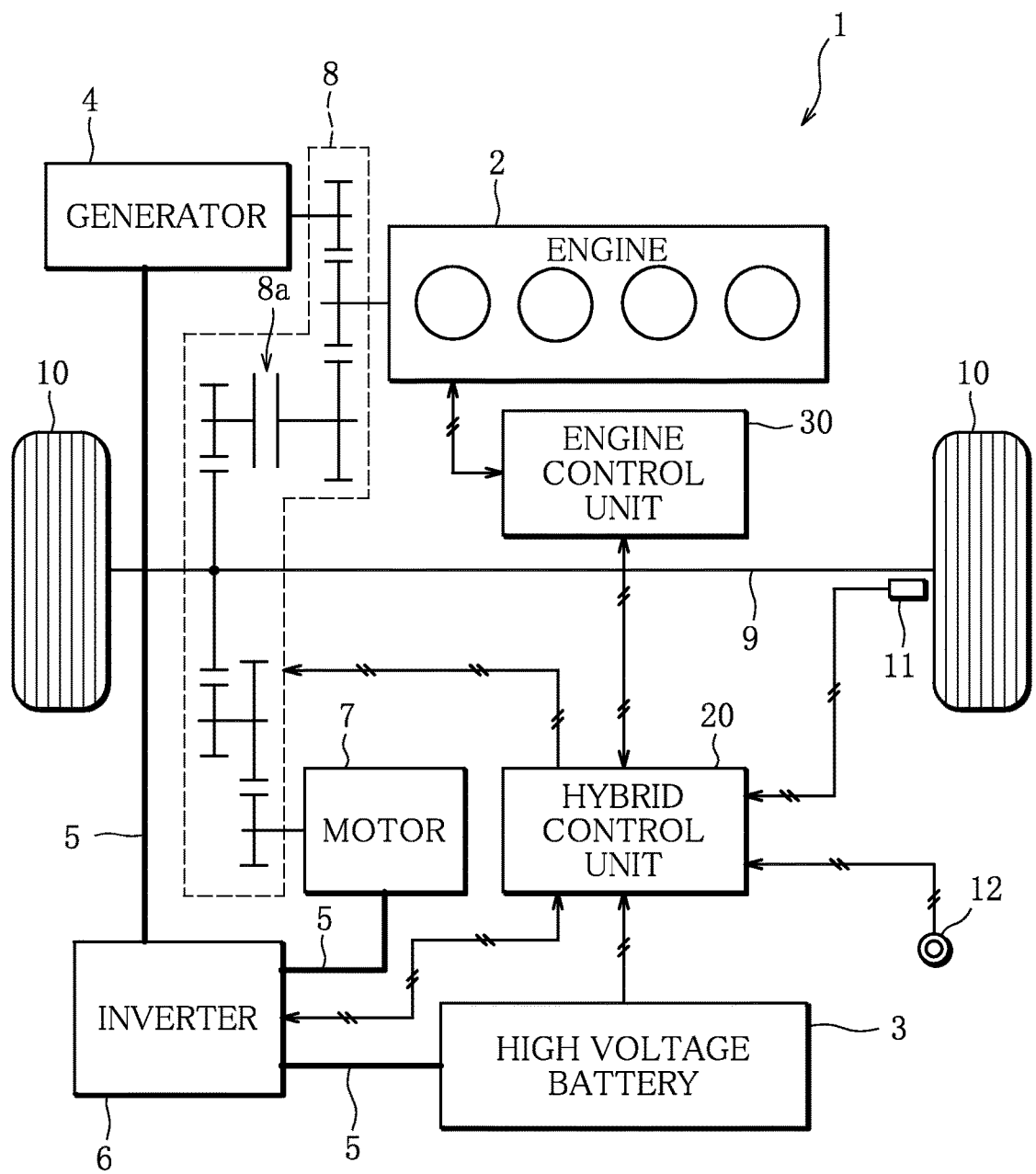
FIG. 1 is a schematic configuration diagram of a hybrid vehicle according to the present invention.

Now, an embodiment of the present invention will be described with reference to the drawings.

FIG. 1 is a schematic diagram of a hybrid vehicle according to the present invention. Now, a configuration of the hybrid vehicle according to the present invention will be described.

As shown in FIG. 1, a vehicle (corresponding to a hybrid vehicle in the present invention) 1 is a hybrid vehicle that includes, as traveling devices for the vehicle 1, an engine (internal combustion engine) 2 that drives drive wheels 10 via a reducer 8 and a drive axle 9, and a motor (electric motor) 7 to which electric power of high voltage is supplied from a high voltage battery (secondary battery) 3 and a generator (power generator) 4 via a high voltage circuit 5, whose operation is controlled by an inverter 6, and that drives the drive wheels 10 via the reducer 8 and the drive axle 9, wherein a charge cable extending from an external power supply is connected to a charging inlet lid (not shown), and the high voltage battery 3 can be charged by a charger. The vehicle 1 also has a function of supplying electric power to an electrical apparatus outside the vehicle by connecting the electrical apparatus outside the vehicle to a power outlet provided in a charging inlet lid or the vehicle 1.

The hybrid vehicle according to the present invention includes the engine 2 provided in the vehicle 1, the high voltage battery 3, the generator 4, the inverter 6, the reducer 8 including a clutch 8a therein, a vehicle speed sensor 11, a charge button 12, a hybrid control unit (vehicle control device) 20, and an engine control unit (internal combustion engine control device, ignition timing correction portion) 30.

The engine 2 is a multicylinder gasoline engine. The engine 2 includes a knock sensor (not shown) that detects knocking in a combustion chamber of the engine 2. An output shaft of the engine 2 is connected to the reducer 8 with a fixed change gear ratio. The operation of the engine 2 is controlled by the engine control unit 30 to generate power based on a control signal such as a requested output value supplied from the hybrid control unit 20 to the engine control unit 30. The power generated by the engine 2 is transmitted to the generator 4 via the reducer 8, and the drive axle 9 that drives the drive wheels 10 via the clutch 8a included in the reducer 8.

The high voltage battery 3 includes a secondary battery such as a lithium-ion battery. The high voltage battery 3 also includes a battery module including a plurality of modules, each module including a plurality of battery cells having a cell monitoring unit that monitors the battery cells, and a battery monitoring unit that monitors a temperature and a state of charge (hereinafter referred to as SOC) of the battery module based on an output signal from the cell monitoring unit (state-of-charge detection portion).

The generator 4 is driven by power output from the engine 2 to generate electric power, and supplies the electric power to the high voltage battery 3 and the motor 7 via the inverter 6. The operation of the generator 4 is controlled by the inverter 6.

The inverter 6 includes a motor control unit and a generator control unit (not shown), and controls an amount of electric power generation of the generator 4 and an output of the motor 7 based on a control signal from the hybrid control unit 20.

The motor 7 is driven by electric power generated by the generator 4 or electric power stored in the high voltage battery 3. The motor 7 drives the drive wheels 10 via the reducer 8 and the drive axle 9.

The reducer 8 includes the clutch 8a therein. The clutch 8a is mounted between the engine 2 and the drive axle 9, and connects/disconnects transmission of power of the engine 2 to the drive axle 9 based on a control signal from the hybrid control unit 20.

The vehicle speed sensor 11 detects a vehicle speed (corresponding to a traveling state of the vehicle in the present invention) of the vehicle 1. The vehicle speed sensor 11 supplies a vehicle speed signal to the hybrid control unit 20.

The charge button 12 is provided in a cabin. A charge mode can be performed in which when an occupant or the like of the vehicle 1 pushes the charge button 12 to turn on, the generator 4 is arbitrarily operated to generate electric power regardless of the SOC of the high voltage battery 3 until the charge button 12 is again pushed and released to turn off. The charge button 12 may be a switch or the like as long as an operation of the charge mode can be switched on/off.

The hybrid control unit 20 is a control device for generally controlling the vehicle 1, and includes an input/output device, a storage device (ROM, RAM, nonvolatile RAM, or the like), a central processing unit (CPU), a timer, or the like.

To an input side of the hybrid control unit 20, the battery monitoring unit of the high voltage battery 3, the motor control unit and the generator control unit of the inverter 6, sensors such as the vehicle speed sensor 11, the charge button 12 and an accelerator position sensor (not shown), and the engine control unit 30 are connected, and detection information from these instruments are input.

On the other hand, to an output side of the hybrid control unit 20, the motor control unit and the generator control unit of the inverter 6, the reducer 8, and the engine control unit 30 are connected. The hybrid control unit 20 and the engine control unit 30 are connected by a controller area network in which the control units are connected to each other to allow high speed transfer of control information.

The hybrid control unit 20 sends a control signal such as a request output or vehicle speed information to the reducer 8, the engine control unit 30, the motor control unit, and the generator control unit based on detection information of the battery monitoring unit of the high voltage battery 3, the motor control unit and the generator control unit of the inverter 6, and the sensors such as the vehicle speed sensor 11 and the accelerator position sensor, and an operation condition of the charge button 12 to control switching of a hybrid control mode, outputs of the engine 2 and the motor 7, and the amount of electric power generation of the generator 4.

Specifically, the hybrid control mode includes an electric vehicle mode (hereinafter referred to as EV mode), a series mode, a parallel mode, and a charge mode. The hybrid control unit 20 switches the hybrid control mode to the electric vehicle mode (hereinafter referred to as EV mode) when SOC of the high voltage battery 3 is sufficient and the vehicle speed and load of the vehicle 1 are low. Also, the hybrid control unit 20 switches the hybrid control mode to the series mode when the SOC of the high voltage battery 3 is insufficient for the EV mode or when high electric power is required in acceleration or the like. The hybrid control unit 20 switches the hybrid control mode to the parallel mode in traveling in a high speed region with high efficiency of the engine 2, that is, high fuel efficiency of the engine 2. The hybrid control unit 20 switches the hybrid control mode to the charge mode, when the occupant or the like of the vehicle 1 pushes the charge button 12 to turn on, until the charge button 12 is again pushed and released to turn off. The hybrid control unit 20 sends a request output signal to the engine control unit 30 so as to provide output torque of the engine 2 depending on the amount of electric power generation of the generator 4, and the vehicle speed and the load of the vehicle 1 in the series mode and the parallel mode.

The EV mode is a series mode described later in which the operation of the engine 2 is stopped, the clutch 8a in the reducer 8 is disconnected, the motor 7 is driven by electric power stored in the high voltage battery 3, and the drive wheels 10 are driven only by power of the motor 7 to cause the vehicle 1 to travel, that is, the engine 2 is not caused to operate.

In the series mode (corresponding to the driving mode in the present invention), the clutch 8a in the reducer 8 is disconnected, the operation of the engine 2 is controlled, and the generator 4 is driven by power output from the engine 2 so as to prevent the SOC of the high voltage battery 3 from being less than a predetermined value. While the high voltage battery 3 is charged with electric power generated by the generator 4, the motor 7 is driven by electric power generated by the generator 4 and electric power stored in the high voltage battery 3, and the drive wheels 10 are driven by power of the motor 7 to cause the vehicle 1 to travel. Specifically, the series mode is a mode in which the vehicle 1 is not caused to travel by power of the engine 2. In the series mode, the output torque of the engine 2 is determined depending on the amount of electric power generation of the generator 4 and the vehicle speed and the load of the vehicle 1. Thus, with decreasing amount of electric power generation of the generator 4 and decreasing vehicle speed and load of the vehicle 1, the output torque of the engine 2 is reduced to minimum output torque required for charging the high voltage battery 3, and at this time, the rotational speed of the engine 2 is low.

In the parallel mode, the operation of the engine 2 is controlled, and the generator 4 is driven by the engine 2. The motor 7 is driven by electric power generated by the generator 4 and electric power stored in the high voltage battery 3, and the drive wheels 10 are driven by power of the motor 7. Further, in the parallel mode, the clutch 8a in the reducer 8 is connected, the operation of the engine 2 is controlled, and the drive wheels 10 are driven by power of the engine 2 via the reducer 8 to cause the vehicle 1 to travel. Specifically, the parallel mode is a travel mode in which the vehicle 1 is caused to travel by power of the motor 7 and the engine 2.

The charge mode is a mode in which when the occupant or the like of the vehicle 1 pushes the charge button 12 to turn on, the generator 4 is operated to generate electric power regardless of the SOC of the high voltage battery 3 and supply the electric power to the high voltage battery 3 or the electrical apparatus outside the vehicle until the charge button 12 is again pushed and released to turn off. The charge mode is performed when the hybrid control mode is the EV mode or the series mode. If the charge mode is selected in the EV mode, the hybrid control mode is switched to the series mode because the engine 2 starts operation.

The engine control unit 30 is a control device for generally controlling the engine 2, and includes an input/output device, a storage device (ROM, RAM, nonvolatile RAM, or the like), a central processing unit (CPU), a timer, or the like.

To an input side of the engine control unit 30, a plurality of electronic control instruments such as an electronic control throttle valve provided in the engine 2, a plurality of sensors such as the knock sensor or the crank angle sensor provided in the engine 2, and the hybrid control unit 20 are connected, and detection information from these instruments and sensors are input.

On the other hand, to an output side of the engine control unit 30, the plurality of electronic control instruments such as the electronic control throttle valve, an exhaust gas recirculation valve, a fuel injection valve, or an ignition plug provided in the engine 2 and the hybrid control unit 20 are connected.

The engine control unit 30 controls an opening or the like of the exhaust gas recirculation valve so that an exhaust gas component is a prescribed value or less, and controls the operation of the plurality of electronic control instruments to control a fuel injection amount and an intake air amount so as to provide an engine output requested by the hybrid control unit 20, based on a request signal of the engine output sent from the hybrid control unit 20. If the knock sensor detects occurrence of knocking when the engine 2 is in operation and the vehicle 1 is traveling, the engine control unit 30 performs first ignition timing correction control to once significantly retard ignition timing (for example, 2° to 3°) and then advance ignition timing until ignition timing when the knock sensor does not detect knocking is reached. A correction amount of the ignition timing to the retardation side in the first ignition timing correction control is previously determined by experiment or analysis, mapped and stored in the engine control unit 30.

If the vehicle speed (corresponding to the traveling state of the vehicle in the present invention) detected by the vehicle speed sensor 11 is less than a predetermined value (corresponding to a predetermined stop state in the present invention) when the hybrid control mode is the series mode, the charge mode is selected, and the engine 2 is in operation, the engine control unit 30 performs, rather than the first ignition timing correction control, second ignition timing correction control (corresponding to correction of ignition timing in the present invention) with a larger correction amount of the ignition timing to the retardation side as compared to correction of the ignition timing to the retardation side by the first ignition timing correction control. The correction amount of the ignition timing to the retardation side in the second ignition timing correction control is previously determined by experiment or analysis as a larger correction amount (for example, 7° to 8°) as compared to the correction amount in the first ignition timing correction control, mapped and stored in the engine control unit 30.

Now, stop-time knocking preventing control performed by the hybrid control unit 20 and the engine control unit 30 thus configured according to the present invention will be described.

FIG. 2 is a flowchart of a control routine of the stop-time knocking preventing control performed by the hybrid control unit 20 and the engine control unit 30.

As shown in FIG. 2, in Step S10, it is determined whether or not the hybrid control mode is the series mode. When the determination result is true (Yes), and the hybrid control mode is the series mode, the process proceeds to Step S12. When the determination result is false (No), and the hybrid control mode is not the series mode, this routine is returned.

In step S12, it is determined whether the charge mode is selected or not. Specifically, it is determined whether the charge mode is selected or not in which the occupant or the like of the vehicle 1 pushes the charge button 12 to turn on and the generator 4 is operated to generate electric power regardless of the SOC of the high voltage battery 3. When the determination result is true (Yes), and the charge mode is selected in which the occupant or the like of the vehicle 1 pushes the charge button 12 to turn on and the generator 4 is operated to generate electric power regardless of the SOC of high voltage battery 3, the process proceeds to step S14. When the determination result is false (No), the occupant or the like of the vehicle 1 does not push the charge button 12 to turn on, and the charge mode is not selected, this routine is exited.

In step S14, it is determined whether the vehicle speed is less than a predetermined value (corresponding to the predetermined stop state in the present invention) or not. When the determination result is true (Yes), and the vehicle speed is less than the predetermined value, the process proceeds to step S16. When the determination result is false (No), and the vehicle speed is not less than the predetermined value, this routine is returned. The predetermined value of the vehicle speed is set to a value at which the stop of the vehicle 1 can be determined.

In step S16, it is determined whether the SOC of the high voltage battery 3 is less than a predetermined value or not. When the determination result is true (Yes), and the SOC of the high voltage battery 3 is less than the predetermined value, the process proceeds to step S18. When the determination result is false (No), and the SOC of the high voltage battery 3 is not less than the predetermined value, the process proceeds to step S20.

In step S18, the ignition timing is corrected to be retarded. Specifically, the ignition timing is corrected to the retardation side by a larger correction amount (for example, 7° to 8°) as compared to the correction of the ignition timing to the retardation side by the first ignition timing correction control based on a preset map. Then, this routine is returned.

In step S20, the load of the engine 2 is low when the SOC is the predetermined value or more, and thus a request output is reduced. Specifically, the request output to the engine control unit 30 is reduced by a predetermined value, that is, output torque of the engine 2 is reduced. Then, this routine is returned.

As such, in the hybrid vehicle according to the present invention, when the hybrid control mode is the series mode, the charge mode is selected, the vehicle speed is less than the predetermined value, and the SOC of the high voltage battery 3 is less than the predetermined value, the ignition timing is corrected to the retardation side by a larger correction amount (for example, 7° to 8°) as compared to the correction of the ignition timing to the retardation side by the first ignition timing correction control based on the preset map. Also, if the SOC of the high voltage battery 3 is the predetermined value or more, the request output to the engine control unit 30 is reduced by a predetermined value, and the output torque of the engine 2 is reduced.

Thus, if the vehicle speed of the vehicle 1 is the predetermined value or less at which the stop of the vehicle 1 can be determined when the charge mode is performed in the series mode, the ignition timing of the engine 2 is corrected to the retardation side by a larger correction amount (for example, 7° to 8°) as compared to the correction of the ignition timing to the retardation side by the first ignition timing correction control based on the preset map. This can prevent occurrence of knocking during the stop of the vehicle 1 when the charge mode is performed in the series mode.

Preventing knocking sound from being produced by occurrence of knocking can prevent discomfort to a driver.

The correction amount of the ignition timing to the retardation side when the vehicle speed of the vehicle 1 is the predetermined value or less at which the stop of the vehicle 1 can be determined is a larger correction amount (for example, 7° to 8°) as compared to the correction amount in the first ignition timing correction control.

For example, the correction amount of the ignition timing to the retardation side during traveling of the vehicle 1 is set to a value such as to allow occurrence of knocking that produces knocking sound that is hardly audible due to noise such as traveling sound, and prioritize the output torque of the engine 2, and the correction amount of the ignition timing to the retardation side when the vehicle speed of the vehicle 1 is the predetermined value or less at which the stop of the vehicle 1 can be determined is set to a larger value than the maximum correction amount of the ignition timing to the retardation side during traveling of the vehicle 1 so as to prevent knocking during the stop of the vehicle 1.

Thus setting the correction amount of the ignition timing to the retardation side generates sufficient output torque in the engine 2 during traveling of the vehicle to provide good operation performance of the vehicle 1, and prevents occurrence of knocking during the stop of the vehicle.

Thus, for example, even if the engine 2 is in a state that is likely to cause knocking due to variations in manufacturing components for configuring the engine 2 or variations in assembling the engine 2, the large correction amount of the ignition timing to the retardation side can prevent occurrence of knocking during the stop of the vehicle.

Also, when the SOC of the high voltage battery 3 is the predetermined value or more, the request output to the engine control unit 30 is reduced by a predetermined value, the output torque of the engine 2 is reduced, the correction of the ignition timing to the retardation side is prohibited, and knocking is caused by adjustment of output torque rather than retardation correction of the ignition timing, thereby preventing a reduction in fuel efficiency due to the retardation correction of the ignition timing.

The description on the embodiment of the present invention is now finished, but the present invention is not limited to the embodiment.

For example, in this embodiment, when the SOC of the high voltage battery 3 is the predetermined value or more, the request output to the engine control unit 30 is reduced by a predetermined value. However, not limited to this, the request output to the engine control unit 30 may be changed based on the SOC of the high voltage battery 3.

In the knocking preventing control, it is determined whether the charge mode is selected or not, that is, whether the charge button 12 is pushed or not. However, not limited to this, determination of the charge mode may be omitted in that as in the charge mode, the engine 2 drives the power generator in the series mode and when the engine 2 is operated during the stop of the vehicle.

EXPLANATION OF REFERENCE SIGNS

1 vehicle (hybrid vehicle)
2 engine (internal combustion engine)
3 high voltage battery (secondary battery)
4 generator (power generator)
6 inverter
7 motor (electric motor)
8 reducer
8a clutch
11 vehicle speed sensor
12 charge button
20 hybrid control unit (vehicle control device)
30 engine control unit (internal combustion engine)

The invention claimed is:

1. A hybrid vehicle with an internal combustion engine, comprising:
   a power generator that is driven by the internal combustion engine;
   a vehicle speed sensor that detects a vehicle speed;
   a vehicle control device that
     determines that the internal combustion engine is driving the power generator, and
     determines that a traveling state of the vehicle is in a stop state based on the detected vehicle speed; and
   an ignition timing correction portion that corrects ignition timing of the internal combustion engine to a retardation side when the vehicle control device determines that the internal combustion engine is driving the power generator and the traveling state of the vehicle is in the stop state.

2. The hybrid vehicle according to claim 1, wherein the ignition timing correction portion sets a correction amount of ignition timing in the stop state larger than a correction amount in a state other than in the stop state.

3. The hybrid vehicle according to claim 1, further comprising:
a secondary battery that stores electric power generated by the power generator, and a state-of-charge detection portion that detects a state of charge of electric power stored in the secondary battery,
wherein the ignition timing correction portion corrects the ignition timing to the retardation side when the state of charge detected by the state-of-charge detection portion is less than a predetermined value.

4. The hybrid vehicle according to claim 3, wherein the vehicle control device reduces output torque of the internal combustion engine when the state of charge detected by the state-of-charge detection portion is the predetermined value or more in the driving mode, and
the ignition timing correction portion prohibits correction of the ignition timing in a state where the output torque of the internal combustion engine is reduced.

5. The hybrid vehicle according to claim 1, further comprising:
an internal combustion engine control device that controls the internal combustion engine,
wherein the internal combustion engine control device includes the ignition timing correction portion.

6. The hybrid vehicle according to claim 5, wherein the vehicle control device determines output torque of the internal combustion engine that drives the power generator based on an amount of electric power generation of the power generator and a vehicle speed and load of the vehicle in the driving mode, and
the internal combustion engine control device controls the internal combustion engine so as to generate the output torque.

7. The hybrid vehicle according to claim 1, further comprising:
a clutch that connects/disconnects a transmission path that transmits power from the internal combustion engine to drive wheels,
wherein the vehicle control device releases the clutch in the driving mode.

8. The hybrid vehicle according to claim 2, further comprising:
a secondary battery that stores electric power generated by the power generator, and a state-of-charge detection portion that detects a state of charge of electric power stored in the secondary battery,
wherein the ignition timing correction portion corrects the ignition timing to the ignition timing larger than the maximum correction value when the state of charge detected by the state-of-charge detection portion is less than a predetermined value.

9. The hybrid vehicle according to claim 8, wherein the vehicle control device reduces output torque of the internal combustion engine when the state of charge detected by the state-of-charge detection portion is the predetermined value or more in the driving mode, and
the ignition timing correction portion prohibits correction of the ignition timing in a state where the output torque of the internal combustion engine is reduced.

10. The hybrid vehicle according to claim 2, further comprising:
an internal combustion engine control device that controls the internal combustion engine,
wherein the internal combustion engine control device includes the ignition timing correction portion.

11. The hybrid vehicle according to claim 10, wherein the vehicle control device determines output torque of the internal combustion engine that drives the power generator based on an amount of electric power generation of the power generator and a vehicle speed and load of the vehicle in the driving mode, and
the internal combustion engine control device controls the internal combustion engine so as to generate the output torque.

12. The hybrid vehicle according to claim 2, further comprising:
a clutch that connects/disconnects a transmission path that transmits power from the internal combustion engine to drive wheels,
wherein the vehicle control device releases the clutch in the driving mode.

* * * * *